United States Patent [19]
Kanemura et al.

[11] Patent Number: 5,751,108
[45] Date of Patent: May 12, 1998

[54] ELECTROLUMINESCENT DEVICE AND METHOD FOR PRODUCING SAME

[75] Inventors: Takashi Kanemura, Nagoya; Masayuki Suzuki, Chiryu; Yutaka Hattori, Okazaki; Nobuei Ito, Chiryu; Tadashi Hattori, Okazaki; Shigeo Kanazawa, Nagoya, all of Japan

[73] Assignee: Nippondenso Co., Ltd., Kariya, Japan

[21] Appl. No.: 703,043

[22] Filed: Aug. 26, 1996

[30] Foreign Application Priority Data

Aug. 25, 1995 [JP] Japan ............... 7-217781
Jun. 4, 1996 [JP] Japan ............... 8-141926

[51] Int. Cl.$^6$ ............... H05B 33/14; H05B 33/20
[52] U.S. Cl. ............... 313/503; 313/467; 313/486
[58] Field of Search ............... 313/503, 467, 313/486; 252/301.65, 301.6 R

[56] References Cited

U.S. PATENT DOCUMENTS

| | | |
|---|---|---|
| 4,508,610 | 4/1985 | Freeman et al. |
| 5,275,840 | 1/1994 | Mikami et al. ............... 427/66 |
| 5,635,111 | 6/1997 | Kawano et al. ............... 252/301.6 S |

FOREIGN PATENT DOCUMENTS

| | | |
|---|---|---|
| 62-076283 | 4/1987 | Japan. |
| 63-230869 | 9/1988 | Japan. |
| 1-102897 | 4/1989 | Japan. |
| 6-009954 | 1/1994 | Japan. |
| 7-08688 | 3/1995 | Japan. |
| 7-169571 | 7/1995 | Japan. |

*Primary Examiner*—Nimeshkumar Patel
*Attorney, Agent, or Firm*—Cushman Darby & Cushman IP Group of Pillsbury Madison & Sutro LLP

[57] ABSTRACT

In an electroluminescent device wherein a first electrode, a first insulating layer, a luminescent layer, a second insulating layer, and a second electrode are laminated in that order on a transparent electrode, the luminescent layer is made of ZnS as a host material and Tb, O, F, and Cl as additives Cl/Tb and Cl/F atomic ratios in the luminescent layer are each between 0.002 and 0.2 inclusively, and Cl concentration in the luminescent layer is between 0.002 at % and 0.2 at % inclusively. By adding a predetermined amount of Cl as mentioned above, the luminescent efficiency and luminescent brightness of the electroluminescent device can be improved.

12 Claims, 3 Drawing Sheets

ENERGY LEVEL OF $Tb^{3+}$

ENERGY LEVEL OF $Tb^{3+}$

DONOR-ACCERTOR LEVEL CAUSED BY Cℓ

ELECTROLUMINESCENT DEVICE AND METHOD FOR PRODUCING SAME

CROSS REFERENCE TO RELATED APPLICATIONS

This application is based upon and claims the benefit of priority of the prior Japanese Patent Applications No. 7-217781 filed on Aug. 25, 1995, and No. 8-141926 filed on Jun. 4, 1996, the contents of which are incorporated herein by reference.

BACKGROUND OF THE INVENTION

1. Field of the Invention

The present invention relates to electroluminescent (hereinafter referred to as EL) devices which are used in various instruments of, for example, emissive-type segment displays and matrix displays. The present invention also relates to methods for producing the same.

2. Related Arts

Conventionally, an EL device with a luminescent layer formed of, for example, zinc sulfide (ZnS) is well known. Using the ZnS luminescent layer as a host material, into the ZnS luminescent layer is added a rare earth element as a luminescent center.

EL devices give different colors depending on the rare earth element added. For example, in a case where ZnS is used as the host material of the luminescent layer, EL devices having terbium (Tb) as the luminescent center produce a green color, EL devices having samarium (Sm) produce a red color, and EL devices having thulium (Tm) produce a blue color.

In order to improve luminescent brightness, JP-A-62-76283 discloses the use of ZnS as a host material doped with a rare earth element acting as a luminescent center and a halogen element. Furthermore, JP-A-1-102897 proposes an EL device, a ZnS luminescent layer of which is doped with a rare earth element acting as a luminescent center, a halogen element and oxygen as additives. It is reported that by adding oxygen as a further additive, a high luminescent brightness can be obtained in comparison with a product without oxygen.

On the other hand, it is reported in JP-A-7-169571 that the EL device can exhibit a high luminescent brightness by pre-treating the inside of a deposition chamber for depositing a luminescent layer with a gas containing chlorine (Cl) before the deposition of the luminescent layer.

However, it was ascertained by the inventors that the EL devices manufactured in accordance with these disclosures actually exhibit an inadequate luminescent brightness.

SUMMARY OF THE INVENTION

The present invention has been accomplished in view of the above-mentioned problem and an object of the present invention is to improve luminescent brightness in EL devices with zinc sulfide luminescent layers to which a rare earth element and a halogen element are added.

According to the present invention, an EL device includes the luminescent layer which is made of ZnS as a host material to which a rare earth element, halogen and Cl are added, wherein an atomic ratio of Cl to the rare earth element is selected to be between 0.002 and 0.2 inclusively.

Further, the luminescent layer is made of ZnS as the host material to which the rare earth element, halogen and Cl are added, and an atomic ratio of Cl to the halogen except for Cl is selected to be between 0.002 and 0.2 inclusive.

Further, the luminescent layer is made of ZnS as the host material to which the rare earth element, halogen and Cl are added, and the number of atoms of Cl in 100 atoms representative of the luminescent layer is selected to be between 0.002 and 0.2 inclusive.

The invention is based on such findings that the addition of Cl to the luminescent layer including ZnS with a rare earth element and halogen increases the luminescent brightness thereof, whereas excessive addition of Cl decreases luminescent brightness thereof. When a specific amount of Cl is added to the luminescent layer, a donor-acceptor pair due to the addition of Cl is created in the luminescent layer, and the energy thereof is transferred to the process of excitation/recombination of the luminescent center, whereby luminescent efficiency and luminescent brightness are improved.

The above-mentioned luminescent layer can be made by a sputtering method. Further, when a sputtering target installed in a forming chamber is pre-sputtered with a gas including Cl, an atmosphere in the forming chamber and a face of the sputtering target include Cl. Therefore, Cl can be added to the luminescent layer without including Cl gas during sputtering.

In the pre-sputtering, when a flow rate of a gas including Cl with respect to a flow rate of all gases is controlled to be between 0.002 vol % and 0.2 vol %, the concentration of Cl added to the luminescent layer can be controlled to be within the above mentioned value range.

Other objects and features of the present invention will become more readily apparent from a better understanding of the preferred embodiments described below with reference to the following drawings.

DETAILED DESCRIPTION OF THE PRESENTLY PREFERRED EXEMPLARY EMBODIMENTS

Embodiments according to the present invention will be described hereinunder with respect to the drawings.

Figure 1:
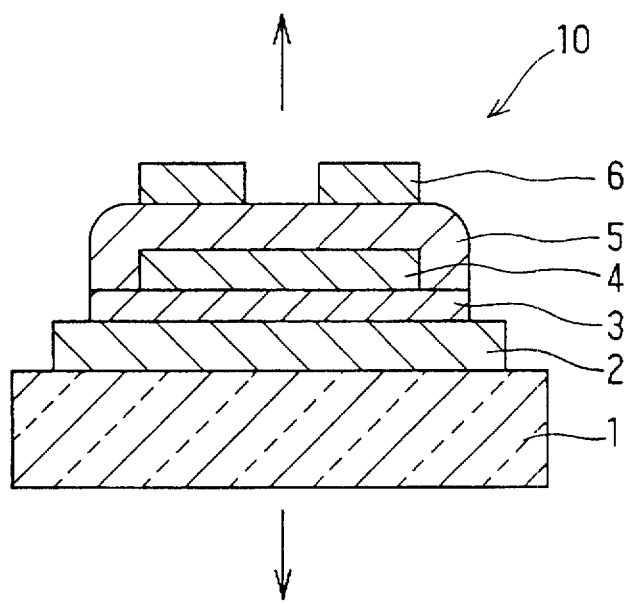
FIG. 1 is a cross-sectional view showing an EL device according to an embodiment of the present invention.

FIG. 1 is a cross-sectional view of a thin film EL device 10 according to a preferred embodiment. In the EL device 10 in FIG. 1, the light is emitted upwardly and downwardly as indicated by arrows.

The EL device 10 comprises a first transparent electrode (first electrode) 2 made of optically transparent zinc oxide (ZnO), a first insulating layer 3 made of optically transparent ditantalum pentaoxide ($Ta_2O_5$), a luminescent layer 4 made of ZnS doped with Tb as a luminescent center, a second insulating layer 5 made of optically transparent ($Ta_2O_5$), and a second transparent electrode (second electrode) 6 made of optically transparent ZnO, all of which are laminated in that order on an insulating glass substrate 1.

The thickness of the transparent electrodes 2 and 6 is preferably 300 nm each, that of the insulation layers 3 and 5 is preferably 400 nm each, and that of the luminescent layer 4 is preferably 500 nm. The thickness of each layer is measured at the center of the glass substrate 1.

The method for producing the thin film EL device 10 referred above is described below.

First, the first transparent electrode 2 is deposited on the glass substrate 1. Concretely, ZnO powder mixed with gallium oxide ($Ga_2O_3$) is formed into a pellet to be used as a evaporation material. Further, an ion plating system is used for a deposition system. Inside of a forming chamber of the ion plating system is evacuated while the glass substrate 1 is maintained at a constant temperature. Thereafter, an argon (Ar) gas is introduced into the chamber to maintain a constant pressure, and a beam current and an RF power are controlled so that a deposition rate is 6–18 nm/min.

Next, the first insulating layer 3 made of $Ga_2O_5$ is deposited on the first transparent electrode 2 by a sputtering method. Concretely, a mixed gas including Ar and oxygen ($O_2$) is introduced into a sputtering device while the glass substrate 1 is maintained at a constant temperature. Thereafter the first insulating layer is deposited with an RF power.

On the first insulating layer 3, the luminescent layer 4 made of ZnS:Tb, O, F, that is, made of ZnS as the host material doped with Tb, fluorine (F), and O as additives is deposited by an RF magnetron sputtering method. A sintered target of ZnS to which terbium oxide and terbium fluoride are added is used as a sputtering target.

Further, in this embodiment, the target installed in a forming chamber is pre-sputtered before depositing the luminescent layer 4.

In the pre-sputtering, the glass substrate 1 with the first insulating layer 3 formed thereon is set to a substrate holder and conveyed into the forming chamber in which the target is installed. In this case, the glass substrate 1 is disposed so as to keep enough distance with respect to the target so as not to be affected by the pre-sputtering. Next, after evacuating the inside of the forming chamber to $10^{-5}$ Pa or less, a mixed gas including Ar, helium (He) and hydrogen chloride (HCl) is introduced into the forming chamber to control the sputtering pressure to be 3 Pa. The target is then pre-sputtered with an RF power of 2.3 W/cm$^2$ for 40 min, for example.

Next, the mixed gas introduced into the forming chamber is changed to a mixed gas only including Ar and He, and the glass substrate 1 is moved to a position for deposition of the luminescent layer 4 thereon by sputtering.

According to the above mentioned pre-sputtering, since an atmosphere in the forming chamber and a face of the target include Cl, Cl can be added to the luminescent layer 4 without the use of a gas including Cl when the luminescent layer 4 is deposited. An atomic ratio of Cl to Tb (Cl/Tb), an atomic ratio of Cl to F (Cl/F), and an atomic ratio of Cl to the whole number of atoms in the luminescent layer 4 (Cl concentration (at %) in the luminescent layer 4) can each be adjusted by means of controlling a flow rate of HCl with respect to a flow rate of all gases or the pre-sputtering time.

In the luminescent layer 4 of this embodiment, each of the additives except for Cl, i.e., Tb, O and F, is added by 1 at % with respect to ZnS into the luminescent layer 4, so that atomic ratios among Tb, O and F in the luminescent layer 4 are the same, 1.

Next, the second insulating layer 5 made of $Ga_2O_5$ is deposited on the luminescent layer 4 in the same way as the first insulating layer 3. The second transparent electrode 6 made of ZnO is also deposited on the second insulating layer 5 in the same way as the first transparent electrode 2.

The relationships between a luminescent brightness and the Cl/Tb ratio, Cl/F ratio, and Cl concentration in the luminescent layer 4 of the EL device 10 thus formed will be described below.

First, several samples having the predetermined Cl/Tb ratio, Cl/F ratio, and Cl concentration in the luminescent layer were formed by controlling the HCl flow rate from 0.002 vol % to 0.2 vol % during the pre-sputtering. The RF power during the pre-sputtering was 2.3 W/cm$^2$ and the pre-sputtering time was 40 min. Next, the samples were driven with AC pulse of 250 Hz, to measure their luminescent brightness (L60). The brightness (L60) is defined as a brightness at a time when the EL device is applied with a voltage which exceeds an emission threshold voltage by 60 V.

Figure 2:
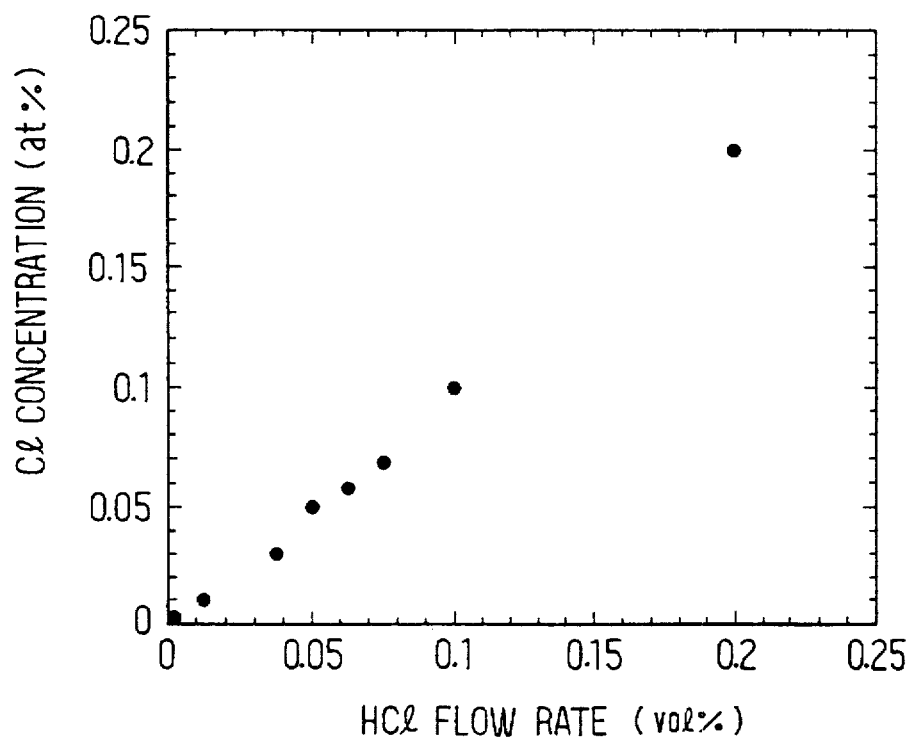
FIG. 2 is a graph showing the relationship between a HCl gas flow rate with respect to a flow rate of all gases for pre-sputtering and a Cl concentration in a luminescent layer.
Figure 3:
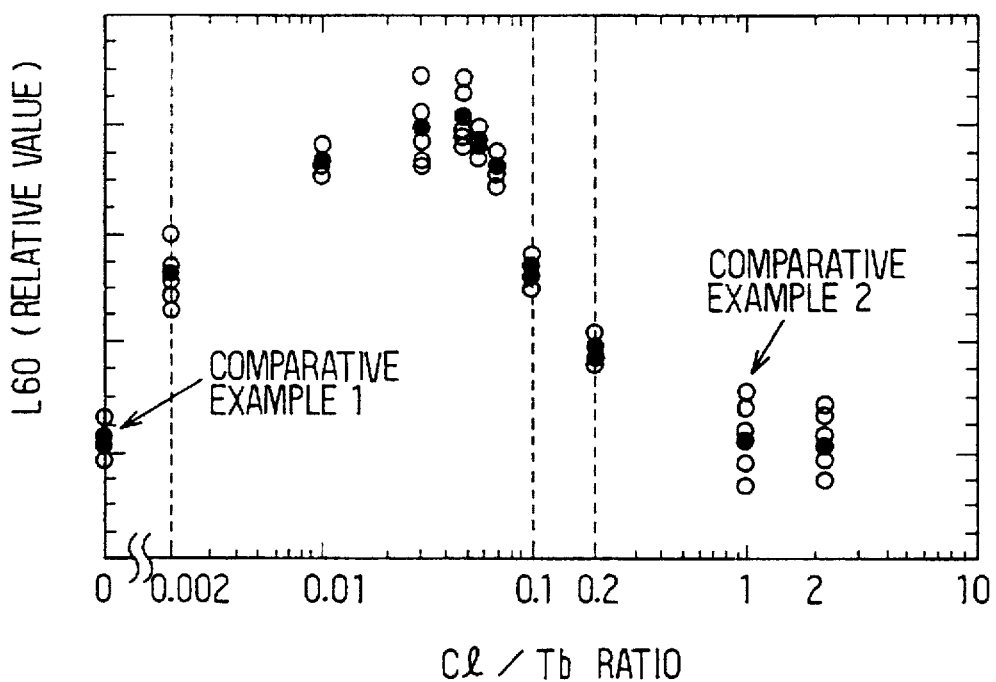
FIG. 3 is a graph showing the relationship between a Cl/Tb ratio in the luminescent layer and an obtained luminescent brightness (L60)
Figure 4:
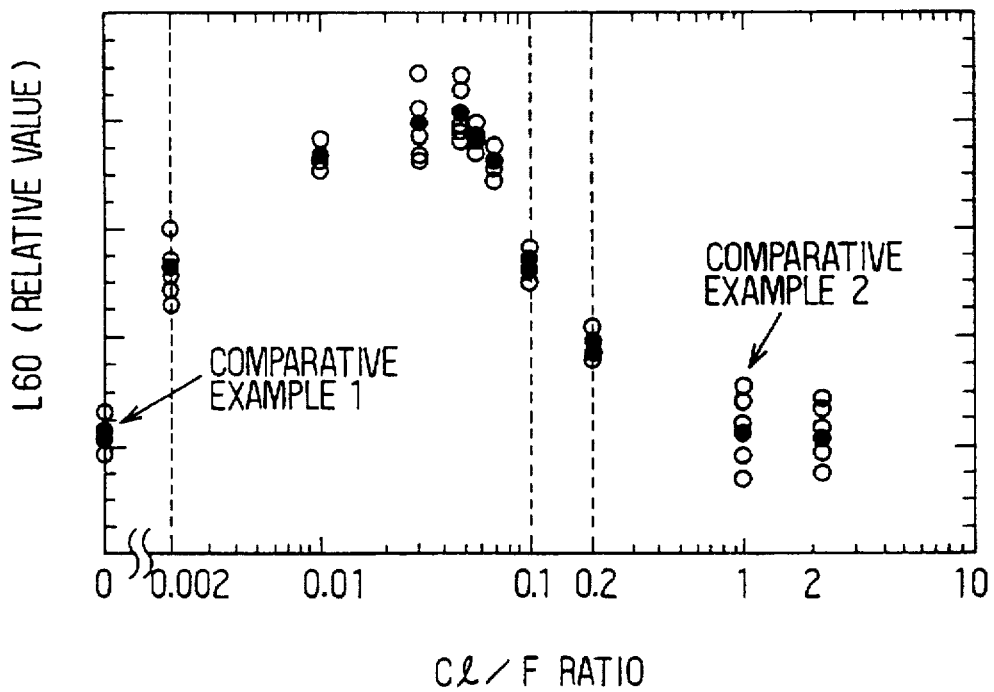
FIG. 4 is a graph showing the relationship between a Cl/F ratio in the luminescent layer and an obtained luminescent brightness (L60)
Figure 5:
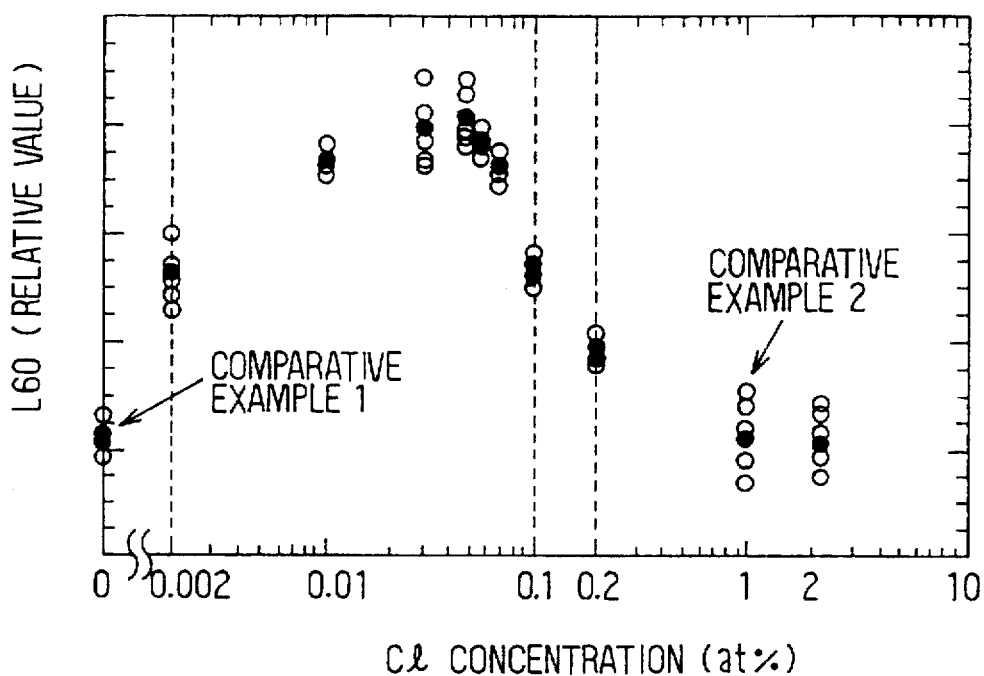
FIG. 5 is a graph showing the relationship between a Cl concentration in the luminescent layer and an obtained luminescent brightness (L60)

FIG. 2 shows the relationship between a ratio of the HCl flow rate to the flow rate of all gases and the Cl concentration in the resultant luminescent layers. FIGS. 3, 4, and 5 show the relationships between L60 and the Cl/Tb ratio, L60 and the Cl/F ratio, and L60 and the Cl concentration respectively.

As verified from FIG. 2, the Cl concentration in the resultant device is directly proportional to the flow rate of HCl during the pre-sputtering.

In FIGS. 3 to 5, white points indicate measured values and black points indicate the means values of the measured values at the same conditions. Further, measurement results of comparative examples 1 and 2 according to prior arts are also plotted in those figures. The comparative example 1 was so constructed that the luminescent layer thereof does not include Cl. On the other hand, although the luminescent layers of the comparative example 2 include Cl, the atomic percent thereof is set to be 1 at %. The comparative example 2 was formed referring to the pre-sputtering condition disclosed in the JP-A-7-169571.

As shown in FIG. 3, the luminescent brightness of the samples in which Cl/Tb ratio is between 0.002 and 0.2 is more than 1.5 times as much as that of the comparative examples 1 and 2, and the luminescent brightness of the samples in which Cl/Tb ratio is between 0.002 and 0.1 is more than 2 times as much as that of the comparative examples 1 and 2.

As shown in FIG. 4, the luminescent brightness of the samples in which Cl/F ratio is between 0.002 and 0.2 is more than 1.5 times as much as that of the comparative examples 1 and 2, and the luminescent brightness of the samples in which Cl/F ratio is between 0.002 and 0.1 is more than 2 times as much as that of the comparative examples 1 and 2.

As shown in FIG. 5, the luminescent brightness of the samples in which Cl concentration is between 0.002 at % and 0.2 at % is more than 1.5 times as much as that of the comparative examples 1 and 2, and the luminescent brightness of the samples in which Cl concentration is between 0.002 at % and 0.1 at % is more than 2 times as much as that of the comparative examples 1 and 2.

Accordingly, when Cl/Tb ratio and Cl/F ratio are between 0.002 and 0.2 respectively (more preferably between 0.002 and 0.1), and Cl concentration is between 0.002 at % and 0.2 at % (more preferably between 0.002 at % and 0.1 at %), the luminescent brightness can be improved greatly as compared with the comparative examples 1 and 2.

This mechanism will be explained referring to FIGS. 6A and 6B.

Figure 6A:
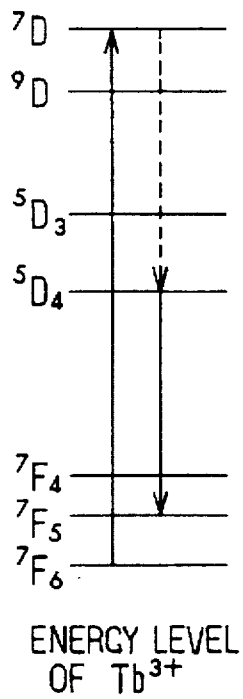
FIG. 6A is a diagram showing energy levels of a Tb ion when Cl is not added in the luminescent layer.

FIG. 6A shows a state of energy levels of a Tb ion ($Tb^{3+}$), so $^7F_6$—$^7D$ show each energy levels of the Tb ion. When Cl is not added to the luminescent layer, the Tb ion is only excited from $^7F_6$ to $^7D$. When such excited Tb ion is recombined to cause the energy level thereof to be shifted from $^5D_4$ to $^7F_5$, luminescence is emitted.

Figure 6B:
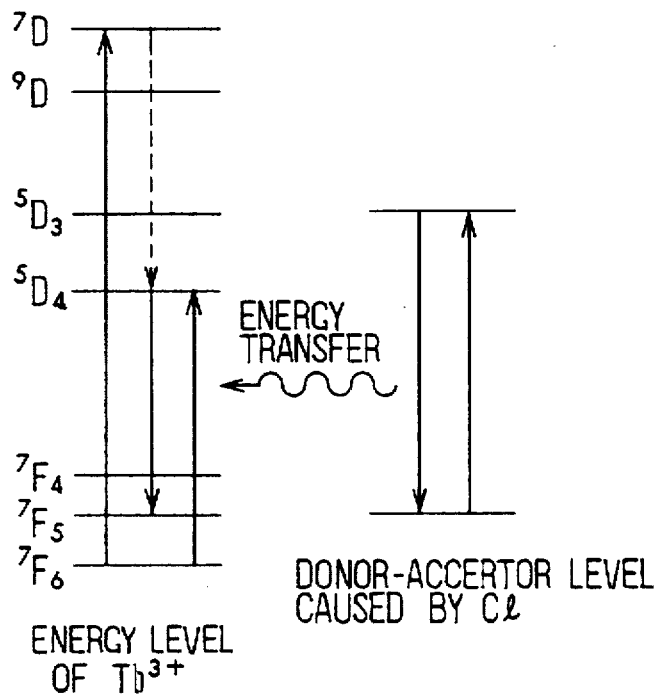
FIG. 6B is a diagram showing energy levels of the Tb ion when Cl is added to the luminescent layer and those of a donor-acceptor pair created due to addition of Cl to the luminescent layer, and showing a state that an energy of the donor-acceptor pair is transferred to the Tb ion.

On the other hand, when Cl is added by the predetermined amount, a donor-acceptor level due to the Cl is formed in the luminescent layer as shown in FIG. 6B, and the Tb ion is excited from $^7F_6$ to $^5D_4$ by energy transferred from a donor-acceptor pair which forms the donor-acceptor level. The Tb ion excited from $^7F_6$ to $^5D_4$ contributes to the luminescence caused by the transition in energy level of the Tb ion from $^5D_4$ to $^7F_5$.

The energy for exciting the donor-acceptor pair created by the added Cl is smaller than the energy for exciting the Tb ion from $^7F_6$ to $^7D$. Therefore, even though a electron having inadequate energy for exciting the Tb ion from $^7F_6$ to $^7D$ is injected into the luminescent layer, if it has enough energy for exciting the donor-acceptor pair, the donor-acceptor pair is excited by the electron, whereby the Tb ion is excited from $^7F_6$ to $^5D_4$ by the energy transferred from the donor-acceptor pair, thus contributing to the luminescence. As a result, luminescent efficiency can be improved.

However, when the amount of Cl added to the luminescent layer is smaller than the predetermined amount, i.e., less than 0.002 at %, the number of the donor-acceptor pair created by the addition of Cl is inadequate to improve luminescent efficiency. On the contrary, when the amount of Cl added to the luminescent layer is larger than the predetermined amount, i.e., more than 0.2 at %, it results in deformation of the host material, so that crystallinity thereof is lowered, whereby acceleration efficiency of the electron is lowered. Consequently, excitation efficiency of the luminescent center is lowered, whereby the luminescent brightness is lowered. Therefore, when the specific amount of Cl is added to the luminescent layer, the luminescent brightness can be improved efficiently.

Further, it is apparent that the addition of Cl to the luminescent layer results in another advantageous effect.

During the deposition of the luminescent layer, there occurs a problem that ions of the iron group, such as $Fe^{2+}$, $Ni^{2+}$, $Co^{2+}$, or the like, which are called killer for the luminescence, are included in the luminescent layer. If the ions of the iron group penetrate into the luminescent layer, the luminescent brightness is decreased largely. However, in the embodiment, the invasion of the ions of the iron group to the luminescent layer can be prevented by Cl, whereby the luminescent brightness can be improved more.

The concentrations of Tb, O, F, Cl, and the ions of the iron group can be measured by electron probe micro analysis (EPMA) or secondary ion mass spectroscopy (SIMS). The measured values normally include measurement errors, so the above mentioned values include the measurement errors.

In the embodiment, although the gas including Cl is introduced into the forming chamber before depositing the luminescent layer 4, the gas including Cl may be introduced during deposition of the luminescent layer 4. In this case, if the flow rate of the gas including Cl with respect to the flow rate of all gases is controlled to be between 0.0002 vol % and 0.02 vol %, the Cl/Tb ratio and the Cl/F ratio can be controlled to be between 0.002 and 0.2, while the Cl concentration can be controlled to be between 0.002 at % and 0.2 at %.

Further, the gas including Cl may be introduced into the forming chamber during the beginning of deposition of the luminescent layer, and thereafter it may not be introduced into the forming chamber during the remaining deposition thereof. For example, the gas including Cl may be stopped from being introduced into the forming chamber when the thickness of the luminescent layer is about 100 nm.

In the embodiment, Tb is used as the rare earth element, but even if another rare earth element such as Sm, Tm or the like is used as a luminescent center, it is apparent to attain the same effects as the embodiment.

Bromine (Br), iodine (I) or the like may be used as the halogen element in lieu of F, and composite of halogen elements also may be used.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An electroluminescent device comprising:

first and second electrodes;

a luminescent layer disposed between said first and second electrodes; and first and second insulating layers respectively disposed between said luminescent layer and said first electrode, and between said luminescent layer and said second electrode;

wherein said luminescent layer is made of zinc sulfide as a host material doped with a rare earth element and a plurality of halogen elements including chlorine, and wherein an atomic ratio of said chlorine to said rare earth element is in a range of not less than 0.002 to not more than 0.2.

2. A device according to claim 1, wherein said plurality of halogen elements include fluorine.

3. A device according to claim 1, wherein said rare earth element is terbium.

4. A device according to claim 1, wherein said atomic ratio of said chlorine to said rare earth element is in a range of not less than 0.002 to not more than 0.1.

5. An electroluminescent device comprising:

first and second electrodes;

a luminescent layer disposed between said first and second electrodes; and first and second insulating layers respectively disposed between said luminescent layer and said first electrode, and between said luminescent layer and said second electrode;

wherein said luminescent layer is made of zinc sulfide as a host material doped with a rare earth element fluorine, oxygen, and chlorine, and wherein an atomic ratio of said chlorine to said fluorine is in a range of not less than 0.002 to not more than 0.2.

6. A device according to claim 5, wherein said rare earth element is terbium.

7. A device according to claim 5, wherein said atomic ratio of said chlorine to said fluorine is in a range of not less than 0.002 to not more than 0.1.

8. An electroluminescent device comprising:

first and second electrodes;

a luminescent layer disposed between said first and second electrodes; and first and second insulating layers respectively disposed between said luminescent layer and said first electrode, and between said luminescent layer and said second electrode;

wherein said luminescent layer is made of zinc sulfide as a host material doped with a rare earth element fluorine, oxygen, and chlorine, and wherein a content of said chlorine in said luminescent layer is in a range of not less than 0.002 at % to not more than 0.2 at %.

9. A device according to claim 8, wherein said rare earth element is terbium.

10. A device according to claim 8, wherein said content of said chlorine in said luminescent layer is in a range of not less than 0.002 at % to not more than 0.1 at %.

11. An electroluminescent device comprising:

first and second electrodes;

a luminescent layer disposed between said first and second electrodes; and first and second insulating layers respectively disposed between said luminescent layer and said first electrode, and between said luminescent layer and said second electrode;

wherein said luminescent layer is made of zinc sulfide as a host material doped with a terbium, oxygen, fluorine, and chlorine, each of said terbium, oxygen, and fluorine having a content of 1 at % relative to said zinc sulfide, and wherein an atomic ratio of said chlorine relative to said terbium is in a range of not less than 0.002 to not more than 0.2.

12. A device according to claim 11, wherein said atomic ratio of said chlorine relative to said terbium is in a range of not less than 0.002 to not more than 0.1.

* * * * *